(12) United States Patent
Mitchell et al.

(10) Patent No.: US 9,809,263 B2
(45) Date of Patent: Nov. 7, 2017

(54) ARTICULATING CART SYSTEM

(71) Applicants: Bradley T. Mitchell, Appleton, MN (US); Jeffrey E. Stitt, Appleton, MN (US)

(72) Inventors: Bradley T. Mitchell, Appleton, MN (US); Jeffrey E. Stitt, Appleton, MN (US)

(*) Notice: Subject to any disclaimer, the term of this patent is extended or adjusted under 35 U.S.C. 154(b) by 0 days.

(21) Appl. No.: 14/993,231

(22) Filed: Jan. 12, 2016

(65) Prior Publication Data
US 2017/0197674 A1    Jul. 13, 2017

(51) Int. Cl.
| | | |
|---|---|---|
| *B62D 51/00* | (2006.01) | |
| *B60P 1/28* | (2006.01) | |
| *B60P 1/38* | (2006.01) | |
| *B62D 51/02* | (2006.01) | |

(52) U.S. Cl.
CPC ............ *B62D 51/008* (2013.01); *B60P 1/283* (2013.01); *B60P 1/38* (2013.01); *B62D 51/001* (2013.01); *B62D 51/005* (2013.01); *B62D 51/02* (2013.01)

(58) Field of Classification Search
CPC ..... B62D 51/008; B62D 51/02; B62D 51/005
See application file for complete search history.

(56) References Cited

U.S. PATENT DOCUMENTS

| | | | | |
|---|---|---|---|---|
| 2,424,670 A | * | 7/1947 | Shimer ................... | B60P 1/16 298/1 C |
| 2,427,132 A | * | 9/1947 | Godbey ................... | B60P 1/16 180/215 |
| 2,867,449 A | * | 1/1959 | Shawver .................. | B62B 5/00 180/11 |
| 2,887,339 A | * | 5/1959 | Reid ........................ | B60P 1/16 180/215 |
| 4,306,734 A | * | 12/1981 | Swanson ................. | B60D 1/32 188/112 A |
| 4,522,281 A | * | 6/1985 | Snider ..................... | B62K 5/01 180/208 |
| 4,750,578 A | * | 6/1988 | Brandenfels ........... | B62B 5/0026 180/13 |
| 4,757,868 A | * | 7/1988 | Cresswell ............. | B62K 5/025 180/11 |
| 4,848,504 A | * | 7/1989 | Olson ..................... | B62B 5/0026 180/19.1 |

(Continued)

*Primary Examiner* — Kevin Hurley
*Assistant Examiner* — Michael Stabley
(74) *Attorney, Agent, or Firm* — Neustel Law Offices

(57) ABSTRACT

An articulating cart system which utilizes an articulating frame to effectively maneuver within tight spaces and a low-elevation platform to ease mounting and dismounting the cart. The articulating cart system generally includes a front frame and a rear frame. A platform is connected to the front frame so that the platform pivots or articulates along with the front frame with respect to the rear frame. A joystick controller may be provided which allows one-handed operation. One or more actuators may be connected between the rear frame and the front frame for pivoting the front frame with respect to the rear frame. A motor is provided to power the actuators and frame wheels. The platform is close to the ground to ease access for the operator. Utilizing the articulating frame, the present invention may traverse much tighter spaces and turns than is possible with previous cart systems.

19 Claims, 14 Drawing Sheets

(56) References Cited

U.S. PATENT DOCUMENTS

| | | | | |
|---|---|---|---|---|
| 4,940,106 A * | 7/1990 | Pedersen | | B62D 12/00 |
| | | | | 180/418 |
| 5,718,534 A * | 2/1998 | Neuling | | B60K 17/043 |
| | | | | 180/11 |
| 5,947,637 A * | 9/1999 | Neuling | | B62D 53/02 |
| | | | | 239/150 |
| 6,039,133 A * | 3/2000 | Zulu | | B62D 11/183 |
| | | | | 180/403 |
| 6,155,648 A * | 12/2000 | Dombek | | B60K 15/03177 |
| | | | | 298/1 C |
| 6,244,366 B1 * | 6/2001 | Otterson | | B62B 3/1404 |
| | | | | 180/11 |
| 6,494,542 B1 * | 12/2002 | Watt | | B24B 7/188 |
| | | | | 280/503 |
| 6,575,819 B2 * | 6/2003 | Beyersdorff | | B24B 7/188 |
| | | | | 125/13.01 |
| 6,619,754 B1 * | 9/2003 | Dombek | | B62B 3/08 |
| | | | | 298/1 C |
| 6,669,304 B2 * | 12/2003 | Binning | | B60P 1/24 |
| | | | | 298/17 B |
| 6,758,291 B1 | 7/2004 | Koch | | |
| 6,986,397 B2 * | 1/2006 | Mattson | | B24B 7/18 |
| | | | | 180/11 |
| 6,991,050 B1 | 1/2006 | Sanford | | |
| 7,004,272 B1 * | 2/2006 | Brown | | B60K 1/00 |
| | | | | 180/65.1 |
| 7,201,453 B2 * | 4/2007 | Vandewinckel | | B62D 33/02 |
| | | | | 296/10 |
| 7,641,285 B2 * | 1/2010 | Jacobs | | B62D 33/0625 |
| | | | | 298/1 C |
| 7,694,772 B1 * | 4/2010 | Doll | | B60T 13/686 |
| | | | | 180/235 |
| 7,699,128 B1 | 4/2010 | Strauss | | |
| 7,726,446 B1 | 6/2010 | Buchanan | | |
| 8,226,155 B2 | 7/2012 | Hill | | |
| 8,397,844 B2 | 3/2013 | Vasant | | |
| 8,522,911 B2 | 9/2013 | Hurd | | |
| 8,662,218 B1 * | 3/2014 | Horn | | B62D 51/02 |
| | | | | 180/14.2 |
| 8,850,636 B2 * | 10/2014 | Gray | | A61G 5/14 |
| | | | | 5/81.1 R |
| 9,415,715 B2 * | 8/2016 | Boulton | | B60P 1/04 |
| 9,493,200 B2 * | 11/2016 | Schwenk | | A63B 55/61 |
| 2004/0256166 A1 * | 12/2004 | Holtan | | B60B 33/0007 |
| | | | | 180/65.51 |
| 2009/0242284 A1 * | 10/2009 | Whetstone, Jr. | | B62B 5/0026 |
| | | | | 180/19.2 |
| 2011/0121541 A1 * | 5/2011 | Yamano | | B60D 1/00 |
| | | | | 280/515 |
| 2014/0076643 A1 | 3/2014 | Osswald | | |

* cited by examiner

ARTICULATING CART SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to an articulating cart and more specifically it relates to an articulating cart system which utilizes an articulating frame to effectively maneuver within tight spaces and provide for a tight turn radius in any direction.

Description of the Related Art

Any discussion of the related art throughout the specification should in no way be considered as an admission that such related art is widely known or forms part of common general knowledge in the field.

Motorized carts and the like are in wide use for a variety of functions. For example, "chore carts" are typically used in agriculture, such as in livestock processing or in farming. Such carts are often required to traverse extremely tight spaces, such as within barns or other agriculture facilities. When traversing such tight spaces, the carts will often require multiple-point turns to simply make a tight turn or turn around. The inability of such carts to traverse tight spaces severely reduces efficiency of agricultural operations in that it requires far more time to make tight turns or turn around when in tightened, enclosed spaces.

During the course of typical usage of such a "chore cart", it is often necessary for the operator to continuously mount and dismount the cart. For example, an operator may need to dismount the cart to load objects, such as deceased livestock, for processing. The operator may then be required to dismount the cart again to unload the objects. In existing carts, it can be difficult to mount/dismount the cart due to either the elevation of the seating area in such carts or due to various obstructions (gates, etc.) which must be avoided or moved out of the way before stepping onto or off of the elevated seating area.

Because of the inherent problems with the related art, there is a need for a new and improved articulating cart system which utilizes an articulating frame to effectively maneuver within tight spaces and a low-elevation platform to ease mounting and dismounting the cart.

BRIEF SUMMARY OF THE INVENTION

Provided herein is a cart system which includes a front frame and a rear frame pivotally connected to the front frame by a pivot connector. A platform is connected to the front frame so that the platform pivots or articulates along with the front frame with respect to the rear frame. The present invention may comprise a plurality of wheels, such as a platform wheel connected to the platform and a frame wheel connected to the rear frame. One or more actuators may be connected between the rear frame and the front frame for pivoting the front frame with respect to the rear frame. A motor is provided to power the actuators and frame wheels, with the motor being centrally located on the articulating frame. The platform is close to the ground and at a lower elevation than the articulating frame to ease access for the operator. By utilizing the articulating frame, the present invention may traverse much tighter spaces and turns than is possible with previous cart systems. The low elevation of the platform also eases mounting and dismounting from the unit.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
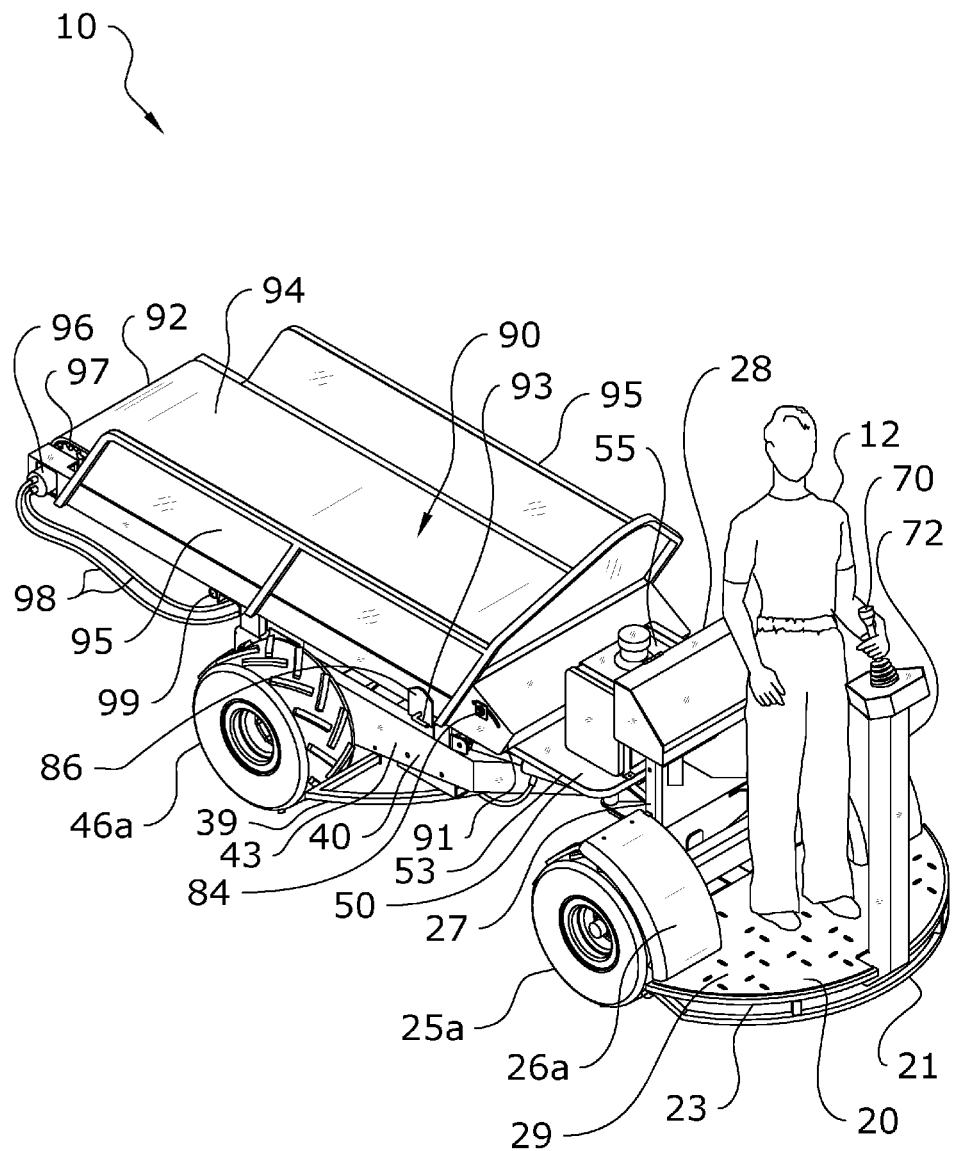
FIG. 1 is an upper perspective view of the present invention.

Turning now descriptively to the drawings, in which similar reference characters denote similar elements throughout the several views, FIGS. 1 through 12 illustrate an articulating cart system 10, which comprises an articulating frame 30 which includes a front frame 31 and a rear frame 40 pivotally connected to the front frame 31 by a pivot connector 45. A platform 20 is connected to the front frame 31 so that the platform 20 pivots or articulates along with the front frame 31 with respect to the rear frame 40. The present invention may comprise a plurality of wheels 25, 46, such as a platform wheel 25 connected to the platform 20 and a frame wheel 46 connected to the rear frame 40. One or more actuators 68, 69 may be connected between the rear frame 40 and the front frame 31 for pivoting the front frame 31 with respect to the rear frame 40. A motor 60 is provided to power the actuators 68, 69 and frame wheels 46, with the motor 60 being centrally located on the articulating frame 30. The platform 20 is close to the ground and at a lower elevation than the articulating frame 30 to ease access for the operator 12. By utilizing the articulating frame 30, the present invention may traverse much tighter spaces and turns than is possible with previous cart systems.

B. Articulating Frame

Figure 7:
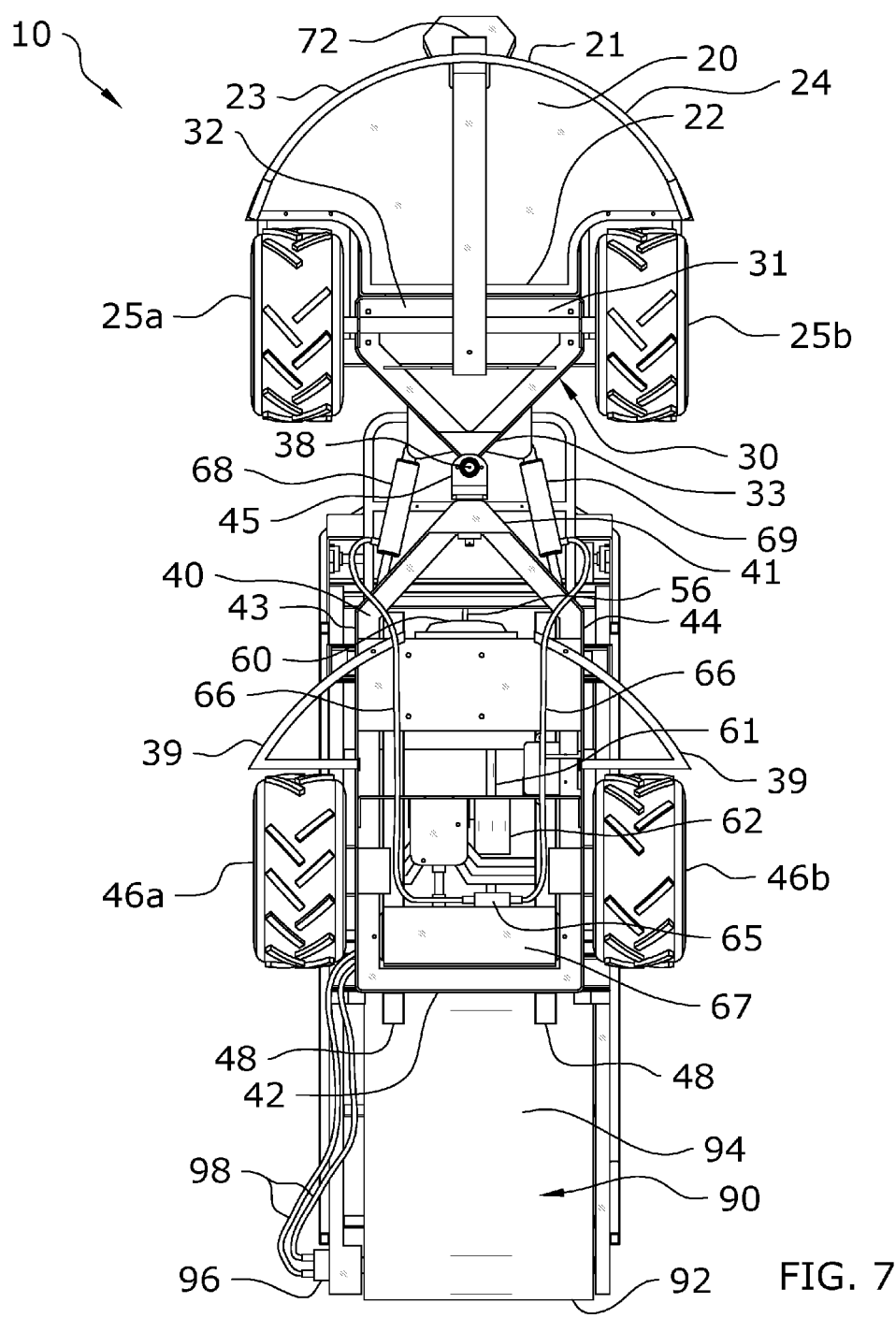
FIG. 7 is a bottom view of the present invention.
Figure 8A:
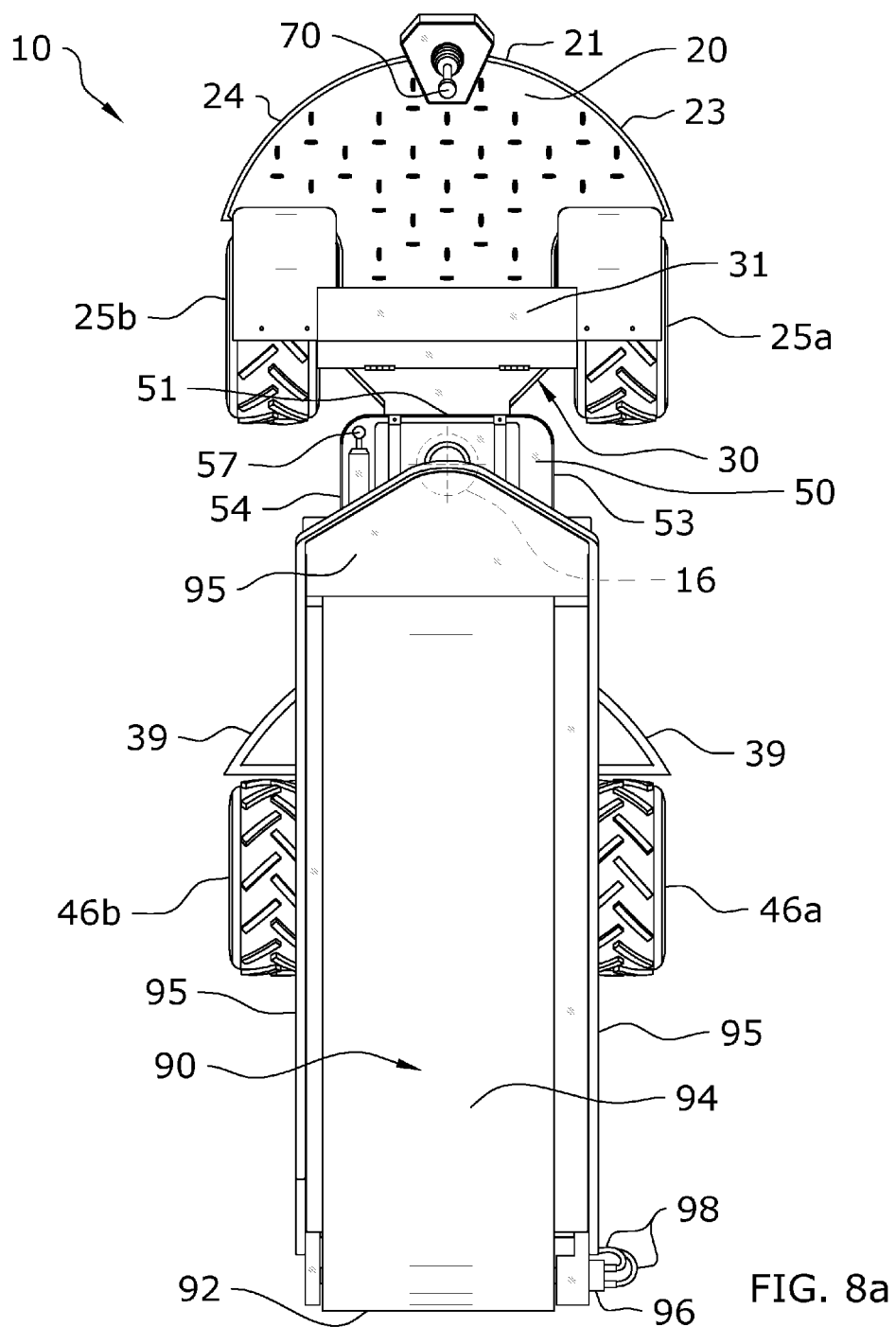
FIG. 8a is a top view of the present invention.
Figure 8B:
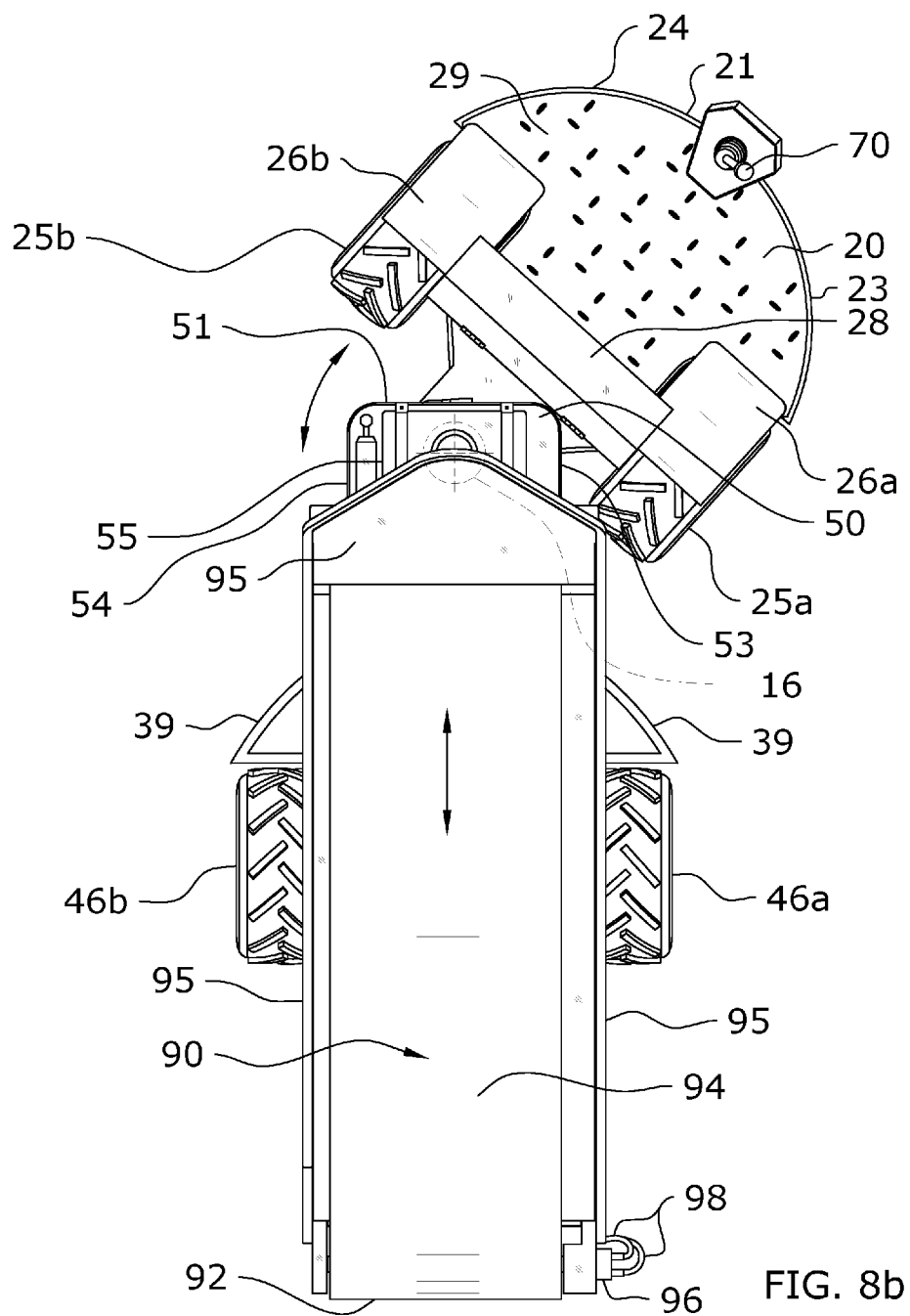
FIG. 8b is a top view of the present invention with the front frame in a first direction.
Figure 8C:
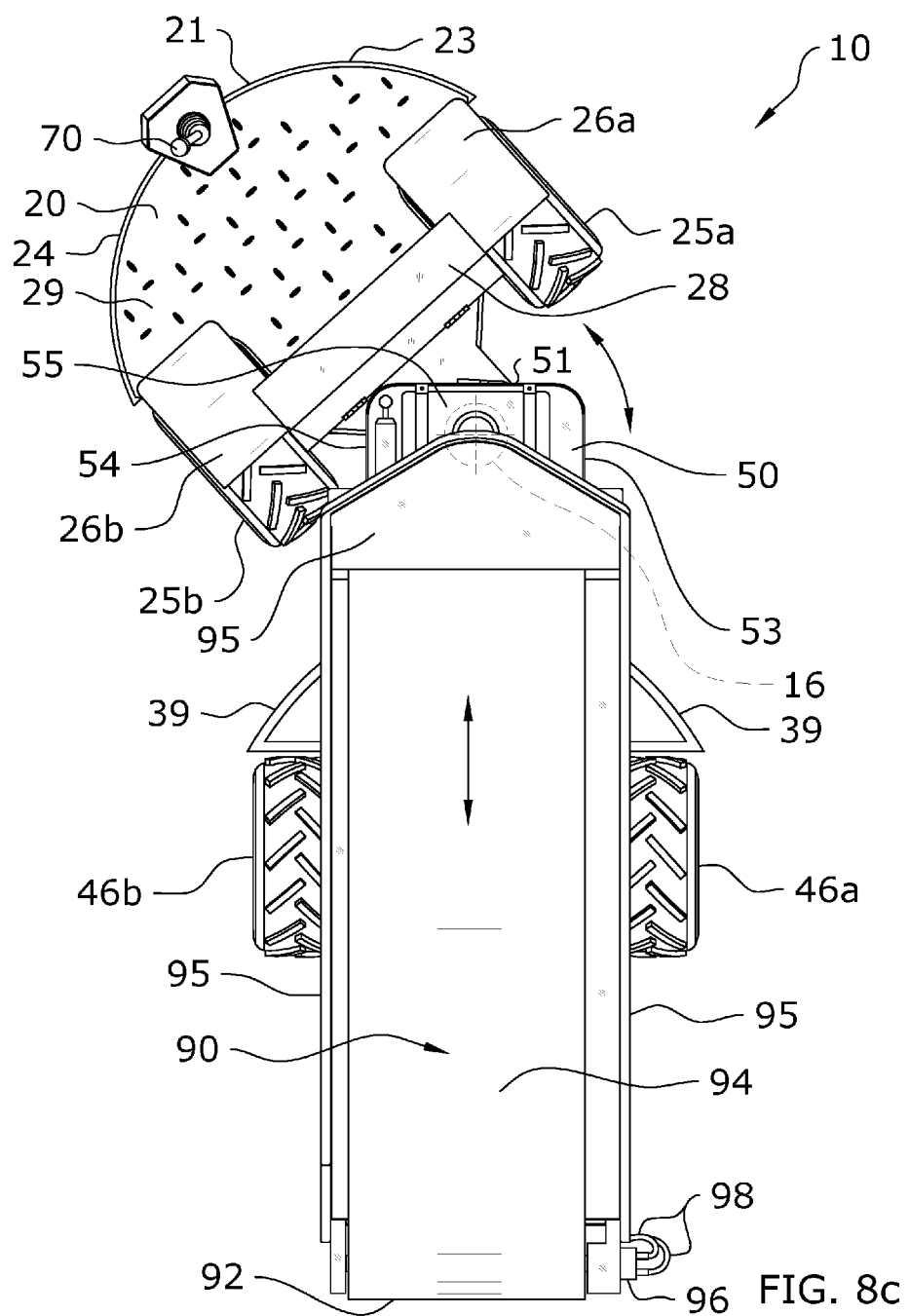
FIG. 8c is a top view of the present invention with the front frame articulated in a second direction.

As shown in FIGS. 7, 8b, and 8c, the present invention utilizes an articulating frame 30 which allows the present invention to drive through a tight space easily and allows for a tight turning radius. Generally, the articulating frame 30 comprises a front frame 31 and a rear frame 40 pivotally connected to the front frame 31 so that the front frame 31 may articulate or pivot in multiple directions about a vertical pivot axis 16 with respect to the rear frame 40.

i. Front Frame.

As best shown in FIG. 7, the front frame 31 of the present invention is pivotally connected to the rear frame 40 such that the front frame 31 pivots about the vertical pivot axis 16. The platform 20 of the present invention is also non-pivotally connected to the front frame 31 such that the platform 20 turns or articulates along with the front frame 31 as it pivots about the vertical pivot axis 16. In some embodiments, the front frame 31 may be integral with the platform 20 rather than being a discrete, connected structure as shown in the figures.

The front frame 31 generally comprises a front end 32 and a rear end 33. The platform 20 is non-pivotally connected to the front end 32 of the front frame 31 as shown in FIG. 7. The rear end 33 is pivotally connected to the rear frame 40 via a pivot pin 38 and pivot connector 45 as shown in the figures. The respective sides of the rear end 33 will preferably taper to form a point, such as a triangular configuration, as shown in the figures. Other configurations may be utilized, however.

Figure 5:
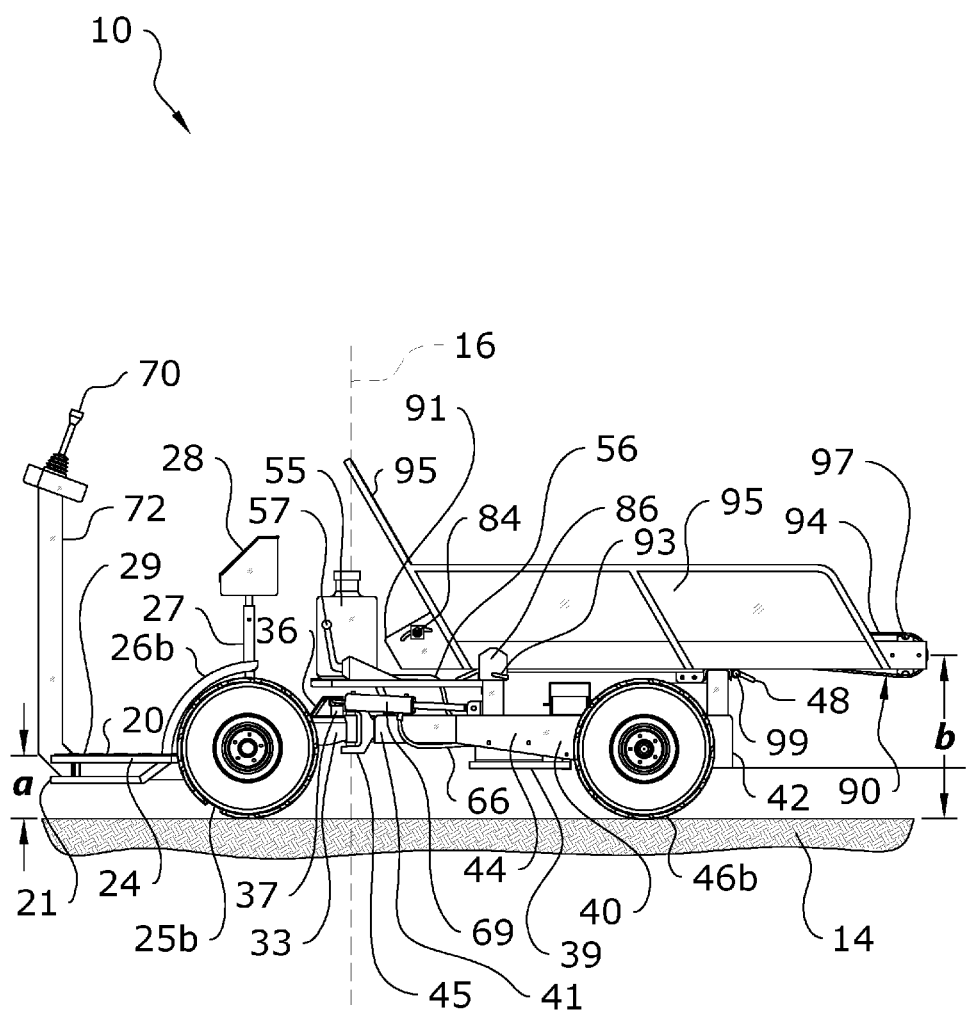
FIG. 5 is a side view of the present invention.
Figure 6:
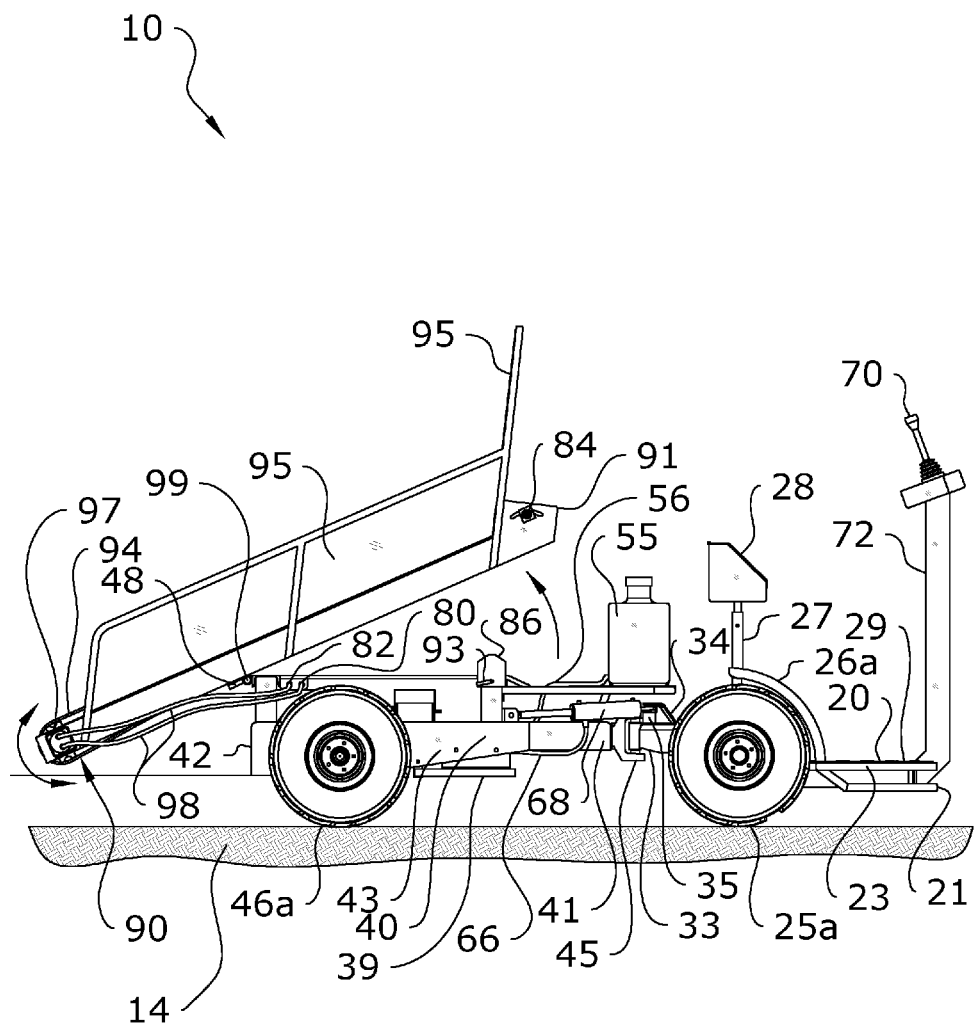
FIG. 6 is a side view of the present invention in a tilted orientation.

As shown in FIGS. 5 and 6, the actuators 68, 69 of the present invention are generally connected between the rear frame 40 and the front frame 31 for pivoting the front frame 31 about the vertical pivot axis 16 with respect to the rear frame 40. The front frame 31 thus includes a first bracket 34 to retain a first mount 35 and a second bracket 36 to retain a second mount 37. The first and second mounts 35, 37 may comprise bearings or other structures to which one end of the actuators 68, 69 may be connected. The first bracket and mount 34, 35 will preferably be positioned near a first side of the front frame 31 while the second bracket and mount 36, 37 will preferably be positioned near a second side of the front frame 31. The pivot pin 38 is generally positioned at the rear end 33 of the front frame 31.

ii. Rear Frame.

As best shown in FIGS. 7, 8b, and 8c, the rear frame 40 is pivotally connected to the front frame 31 such that the front frame 31 may pivot about the vertical pivot axis 16 to form the articulating frame 30 structure. The rear frame 40 will generally support one of a plurality of beds, such as the bed 90 shown in FIGS. 1, 2, 5, 6, 8a, and 10.

As best shown in FIG. 7, the rear frame 40 includes a front end 41, a rear end 42, a first side 43, and a second side 44. As shown in the figures, the front end 41 of the rear frame 40 tapers inwardly to a point to form a triangular configuration similar to the front frame 31. The rear frame 40 will typically include a pivot connector 45 at its front end 41, such as a bracket as shown in the figures, which connects to the pivot pin 38 on the front frame 31 to form the unified articulating frame 30. The pivot connector 45 is preferably adapted to pivot the front frame 31 about a vertically-aligned pivot axis 16 with respect to the rear frame 40 as shown in FIGS. 8b and 8c.

It should be appreciated, however, that in some embodiments the pivot pin 38 may be on the rear frame 40 and the pivot connector 45 may be on the front frame 31. It should also be appreciated that any number of structures or methods known to pivotally connect one item to another may be utilized to pivotally connect the front and rear frames 31, 40 of the articulating frame 30 such that the front frame 31 pivots about the vertical pivot axis 16 with respect to the rear frame 40.

The rear frame 40 will generally include one or more frame wheels 46. In a preferred embodiment, a first frame wheel 46a is positioned at the rear end 42 of the rear frame 40 adjacent to its first side 43. A second frame wheel 46b is positioned at the rear end 42 of the rear frame 40 adjacent to its second side 44. The figures illustrates the frame wheels 46 as being hydraulically-powered, though in some embodiments the frame wheels 46 may be powered electrically or by gas or may not be powered at all, such as in a rear-wheel-drive configuration.

Figure 4:
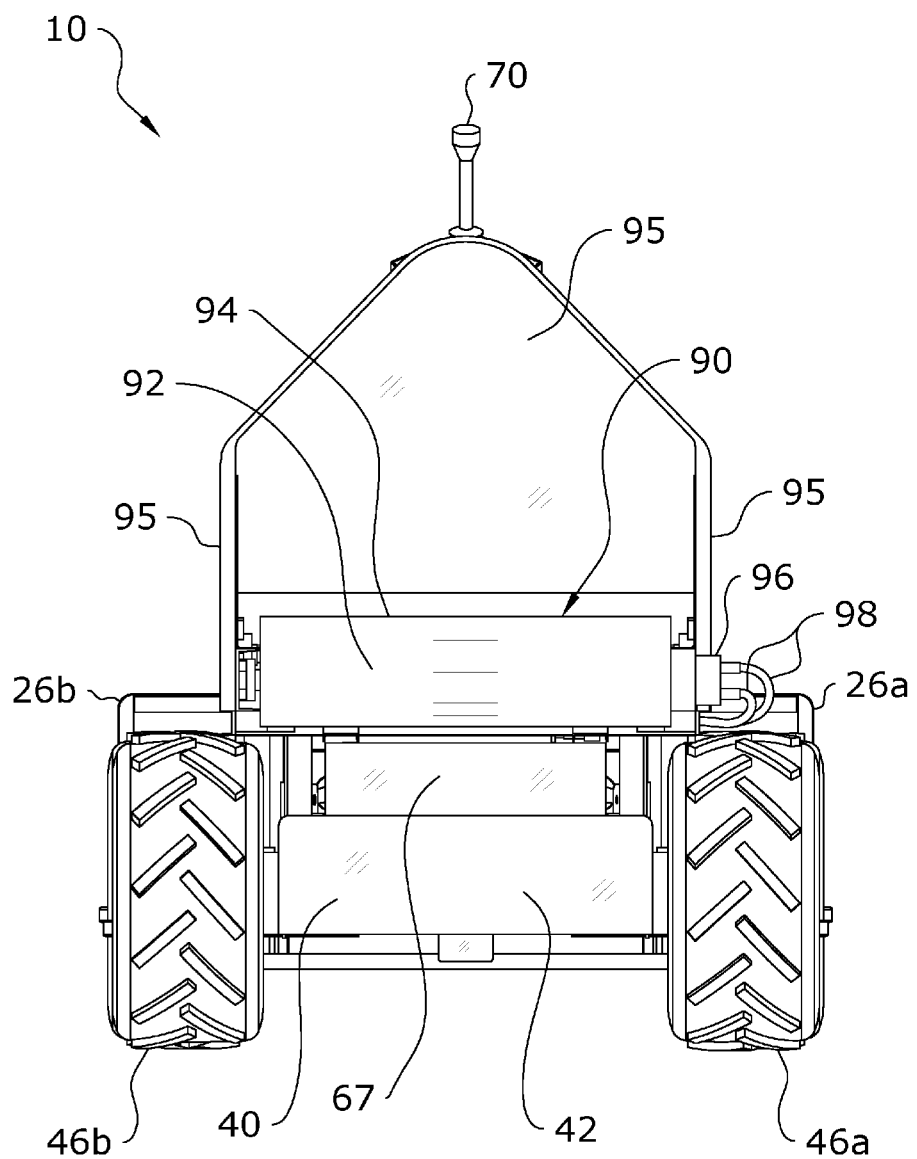
FIG. 4 is a rear view of the present invention.
Figure 9:
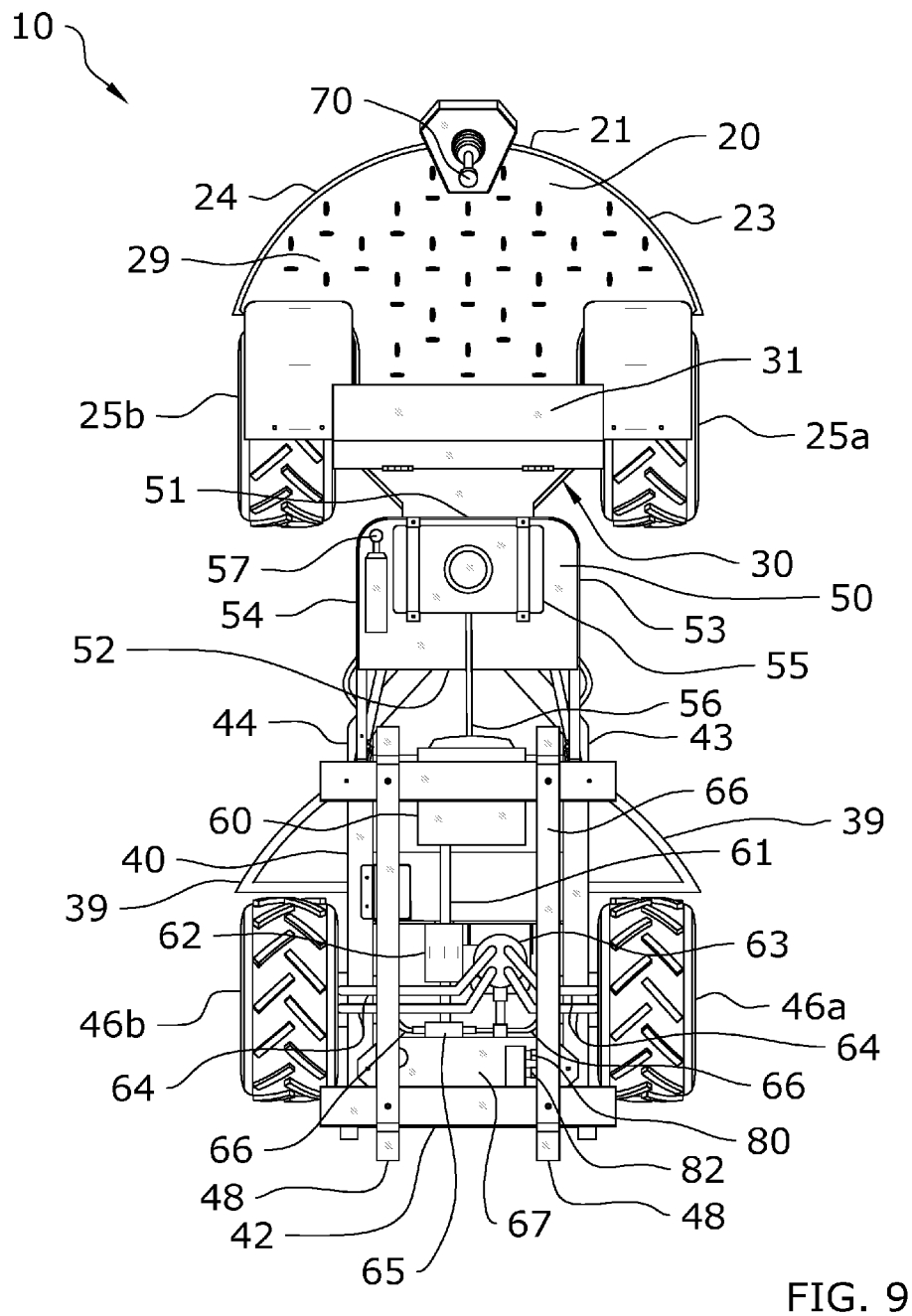
FIG. 9 is a top view of the present invention with the bed removed.

As best shown in FIG. 4, the rear frame 40 will also generally include a plurality of bed supports 48. The bed supports 48 each comprise elongated, durable members such as bars or rods which are oriented on the rear frame 40 to support a bed such as a cargo, flat-bed, or conveyer bed 90. As best shown in FIG. 9, bed supports 48 in a preferred embodiment comprise a first pair of parallel bed supports 48 extending along the first and second sides 43, 44 of the rear frame 40 and a second pair of parallel bed supports 48 extending along the front and rear ends 41, 42 of the rear frame 40 in perpendicular relationship with the first pair of bed supports 48. The manner in which the bed 90 is secured to the bed supports 48 may vary in different embodiments, with the bed 90 being integral with the supports 48 in some embodiments.

C. Platform

As best shown in FIGS. 7, 8a, 8b, and 8c, the present invention includes a platform 20 which is adapted to pivot or articulate along with a front frame 31 with respect to a rear frame 40. The articulating movement of the platform 20 permits the present invention to drive through tight spaces easily while allowing for a tight turning radius. Preferably, an operator 12 will stand upon the platform 20 as shown in FIG. 1 to operate the present invention. When in use, the operator 12 will face the front end 21 of the platform 20. The rear end 22 of the platform is non-pivotally connected to the front frame 31 of the articulating frame 30.

As shown in FIG. 1, the platform 20 generally includes a rounded or curved front end 21 and may include a constant radius of curvature. The platform 20 includes an upper surface 29 on which the operator 12 will stand when the present invention is in use. The platform 20 generally extends forwardly from the front frame 31. The front end 21 of the platform 20 includes a first radial half 23 and a second radial half 24. As shown in the figures, the main controller 70 of the present invention is preferably positioned centrally on the front end 21 of the platform 20 at the intersection of its first and second radial halves 23, 24.

Figure 3:
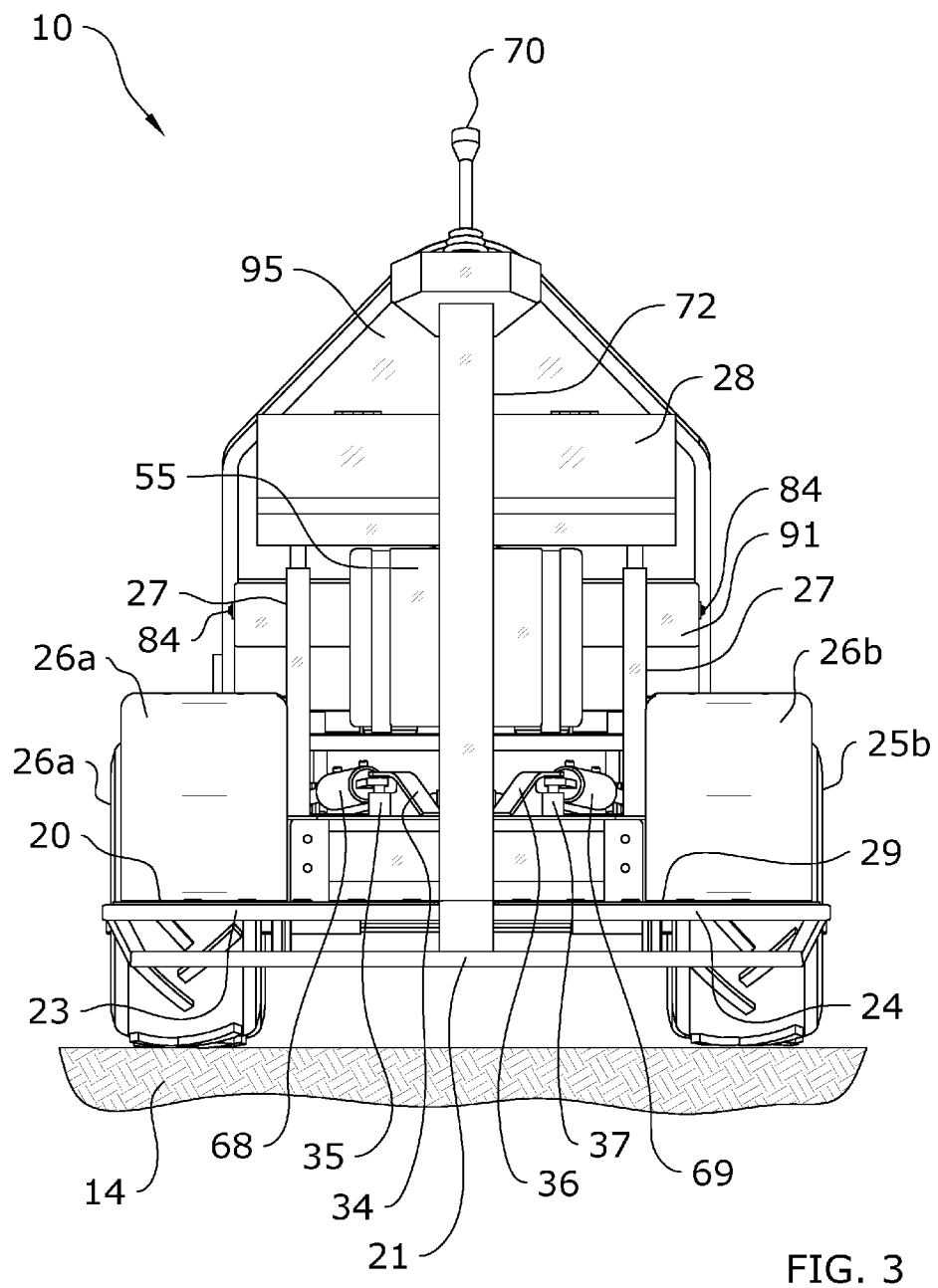
FIG. 3 is a front view of the present invention.

As shown in FIG. 3, the platform 20 will generally comprise a flat planar structure, though other embodiments may be utilized. The upper surface 29 of the platform 20 extends to the edges of the front end 21 of the platform without any raised portions, depressed portions, ribs, flanges, rails, or the like. Thus, the outer edges of the front end 21 of the platform 20 comprise the same elevation and surface as the upper surface 29 of the platform 20 as a whole. Such a configuration permits the operator 12 of the present invention to easily step onto or off of the platform 20 from any direction along its curved front end 21. For example, an operator may dismount the platform 20 along its first radial half 23 to access the left-side of the present invention or along its second radial half 24 to access the left-side of the present invention. With prior art that is not so configured (such as where only one side of the platform 20 is unobstructed), the operator would have to walk around the entire vehicle to access anything along the obstructed side. This could waste critical time in emergency situations.

As shown in FIGS. 5 and 6, the first and second radial halves 23, 24 of the platform 20 are preferably unobstructed, with the sole exception being the main controller 70 which is positioned at the intersection between the radial halves 23, 24. With the present invention there is no risk of tripping over an obstruction when attempting to dismount in haste as would be common if there were obstructions present on the platform 20. Such a configuration greatly improves efficiency of a work day across a wide number of work situations. Without obstructions, an operator 12 may easily mount or dismount the platform 20 without opening a door or gate or having to step over or around any obstructions.

This greatly improves time to deal with critical situations. For example, if a hydraulic line were to become dislodged, an operator would be able to very quickly dismount to reconnect the hydraulic line. An operator of a prior art configuration would not be able to so quickly alleviate the problem due to having to step over an obstruction, open a gate, or step down stairs before having access to the dislodged hydraulic line. Further, As shown in FIGS. 5 and 6, the platform 20 will preferably be positioned close to the ground surface 14. In a preferred embodiment, the platform 20 is positioned lower than the articulating frame 30 or the floor surface 94 of the bed 90 as shown in the figures. By way of example, an upper surface 29 of the platform 20 may be positioned at a distance a above the ground surface 14, where a is preferably between 3 and 9 inches above the ground surface 14. The floor surface 94 of the bed 90 may then be positioned between 24 and 48 inches above the ground surface 14. This configuration and positioning platform 20 allows the operator 12 to conveniently stand upon the platform 20 during operation along with easy departure from the platform 20 to perform a chore. The lower elevation of the front platform 20 also eases access for the operator 12 to mount or dismount the platform 20 without the need for steps, stairs, a ladder, or the like which may form obstructions along the front end 21 of the platform 20.

As shown in FIG. 3, the platform 20 will generally include one or more platform wheels 25. In a preferred embodiment, a first platform wheel 25a is positioned at the rear end 22 of the platform 20 adjacent to the first radial half 23. A second platform wheel 25b is positioned at the rear end 22 of the platform 20 adjacent to the second radial half 24. The figures illustrates the platform wheels 25 as being idler wheels (unpowered and un-driven), though in some embodiments the platform wheels 25 may be powered, such as in a front-wheel-drive or four-wheel-drive configuration.

As shown in FIG. 1, the platform wheels 25 will generally at least partially extend above an upper surface 29 of the platform 20. Such a configuration is often necessary due to the low elevation of the platform 20. Thus, in many embodiments, the mid-point of the platform wheels 25 will be above the upper surface 29 of the platform 20.

As shown in FIG. 3, wheel guards 26 are provided which extend upwardly from the upper surface 29 of the platform 20 to partially enclose the platform wheels 25. Preferably, the wheel guards 26 will be positioned to prevent an operator 12 standing upon the platform 20 from accidentally coming into contact with the platform wheels 25 and becoming injured. Thus, the wheel guards 26 will generally comprise a curved configuration extending upwardly from the platform 20 to partially cover the platform wheels 25. In the embodiment shown in the figures, the platform includes a first wheel guard 26a partially covering the first platform wheel 25a and a second wheel guard 26b partially covering the second platform wheel 25b.

Figure 2:
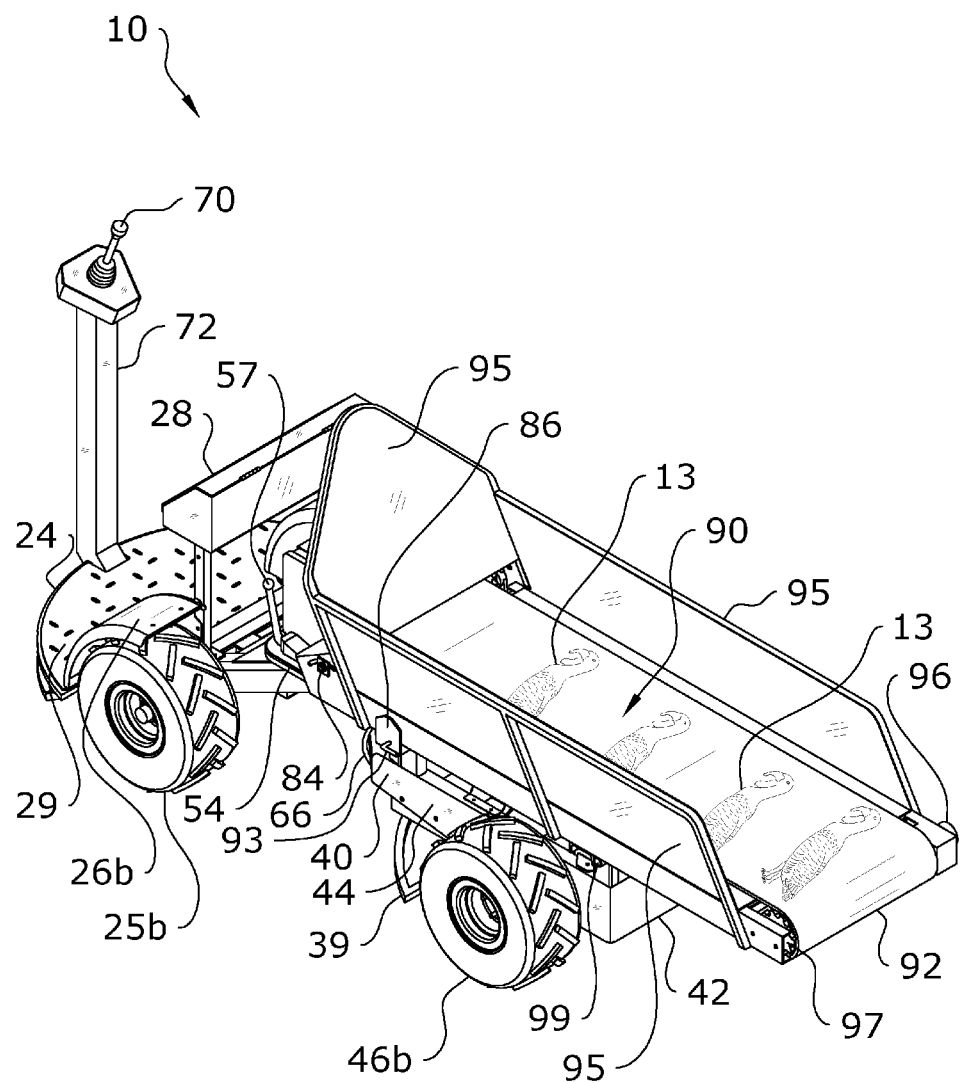
FIG. 2 is a rear perspective view of the present invention.

As shown in FIGS. 1 and 2, the platform 20 may also include an elevated storage container 28 connected to a front end 21 of the platform 20 for storing various tools and the like. The figures illustrate that the storage container 28 may include a hinged lid. The storage container 28 will preferably be elevated to be at approximately waist level with respect to the operator 12, though other configurations may be utilized. Such an elevation allows the storage container 28 to also function as a back rest for the operator 12 on the platform 20 so that the operator 12 may lean or sit on the storage container 28 when operating the present invention. In some embodiments, the storage container 28 may include a removable insert.

Optionally, one or more container poles 27 may extend upwardly from the platform 20; with the storage container 28 being mounted on the container poles 27. In a preferred embodiment, the container poles 27 may be telescopic so that the height of the storage container 28 may be adjusted. Thus, the storage container 28 may be used as a backrest for operators 12 of varying heights. This configuration also eases access to the storage container 28 for operators 12 of varying heights.

D. Tank Support

As best shown in FIG. 9, the present invention may include a tank support 50 which provides a mounting point for a fuel reservoir 55 such as a tank. The tank support 50 includes a front end 51, a rear end 52, a first side 53, and a second side 54. The fuel reservoir 55 may be positioned at any location, but will preferably be positioned toward the front end 51 of the tank support 50. The fuel reservoir 55 is generally fluidly connected with the motor 60 via a fuel conduit 56. The tank support 50 generally comprises a flat surface, such as a plate or the like, which is positioned above the articulating frame 30. The tank support 50 is generally positioned between the storage container 28 and the motor 60, though other configurations may be utilized.

As shown in FIG. 2, a bed controller 57 may be positioned on the tank support 50, such as by extending therefrom, or may be alternatively positioned anywhere with easy access for the operator 12. The bed controller 57 will control the operation of the bed 90 and thus generally be separate from the main controller 70 which is used to control the frame wheels 46 and actuators 68, 69.

As best shown in FIG. 5, the bed controller 57 may comprise various configurations and should not be limited by the exemplary figures. In a preferred embodiment, the bed controller 57 comprises a lever which may be manipulated to control the bed 90. For example, the bed controller 57 may alternate between a forward position in which the conveying surface 94 will move forward, a central position in which the conveying surface 94 will remain idle, and a rear position in which the conveying surface 94 will move in reverse.

E. Hydraulic System

The present invention utilizes a hydraulic system to control the frame wheels 46 and the actuators 68, 69. What follows is merely an exemplary description of one possible embodiment of a system for controlling operation of the frame wheels 46 and actuators 68, 69. It should be appreciated that different embodiments of the present invention may vary greatly in how the frame wheels 46 are driven and how the actuators 68, 69 are controlled and powered.

Figure 11:
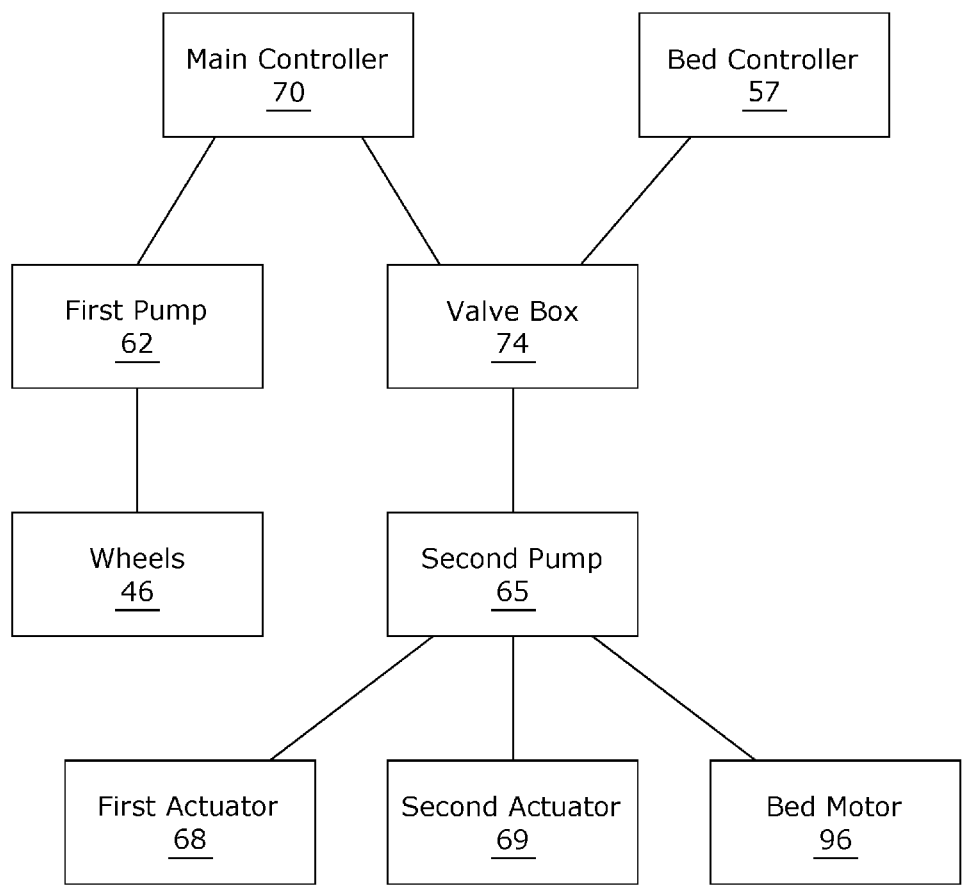
FIG. 11 is a block diagram of an exemplary hydraulic system for use with the present invention.

FIG. 11 is a block diagram of an exemplary hydraulic system for use with the present invention. As shown, the present invention generally includes a motor 60 which is connected to the articulating frame 30 for powering the pumps 62, 65 of the present invention. The motor 60 is always on when the present invention is running to provide power to the pumps 62, 65. Generally, the motor 60 will be centrally located on the articulating frame 30 and thus be mounted behind the platform 20.

The motor 60 may comprise a gas motor as shown in the figures or may comprise other types of motors, such as electric motors and the like. The motor 60 is preferably positioned near the front end 41 of the rear frame 40, which effectively places the motor 60 near the mid-point of the present invention's overall body. This mid-mount motor 60 configuration allows for the platform 20 to be very low to the ground and allows for a tight turning radius by reducing the weight of the front frame 31 and platform 20 which are pivoted or swung by the actuators 68, 69.

Figure 12:
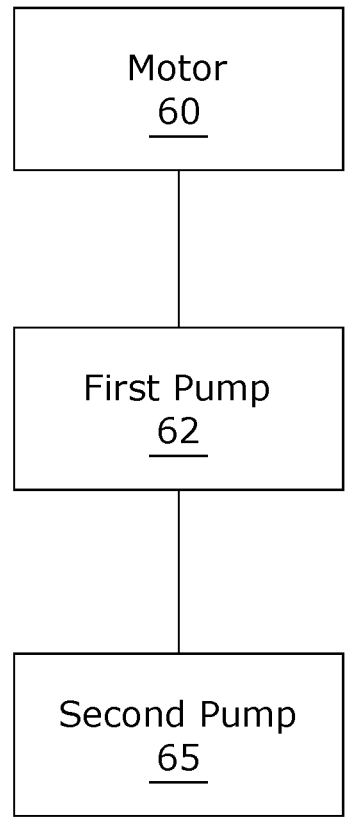
FIG. 12 is a block diagram illustrating connection between the motor and two pumps of the present invention.

FIG. 12 illustrates connection between the motor 60 and the pumps 62, 65. A drive shaft 61 extends from the motor 60 and through the pumps 62, 62 as shown in FIGS. 9 and 12, with the drive shaft 61 being constantly rotated by the motor 60 to provide power to the pumps 62, 65. A first pump 62 is shown as being connected to the drive shaft 61. The first pump 62 will generally provide hydraulic power to the wheels 46 of the present invention. The first pump 62 may comprise various types of pumps, but will preferably comprise a hydrostatic pump. The second pump 65 will generally provide hydraulic power to both of the actuators 68, 69 and to the bed motor 96 through use of a valve box 74. The second pump 65 will preferably comprise a gear pump, and may provide power to any auxiliary hydraulics which are connected to the present invention.

As discussed, the first pump 62 operates the wheels 46 of the present invention. The main controller 70 of the present invention manually opens or closes valves on the first pump 62, such as by cables. When the main controller 70 is pushed forward, the first pump 62 will direct hydraulic fluid flow to the wheels 46 such that the wheels 46 drive forward. When the main controller 70 is pushed backwards, the first pump 62 will direct hydraulic fluid flow to the wheels 46 such that the wheels 46 drive in reverse. When the main controller 70 is pushed neither forward nor backwards, the first pump 62 will direct hydraulic flow in a loop through the hydraulic reservoir 67 so that the wheels 46 are not driven.

As shown in FIG. 9, the first pump 62 may include a filter 63 for filtering the hydraulics of the present invention. The wheel conduits 64 are generally comprised of hydraulic lines which extend between the first pump 62 or filter 63 and the driven wheels 46 of the present invention. In the figures, four wheel conduits 64 are shown comprising a pair of supply lines and a pair of return lines. Other configurations may be utilized in different embodiments. In some embodiments, the wheels 46 may be powered directly by the motor 60 instead of being hydraulically-powered by the first pump 62.

As discussed, the second pump 65 controls operation of the actuators 68, 69 and the bed motor 96. The second pump 65 may also control operation of any auxiliary hydraulic attachments. A valve box 74 is provided to control operation of the second pump 65, with the valve box 74 being connected to the main controller 70, the bed controller 57, and the second pump 65. When the main controller 70 is pushed to the left, valves on the valve box 74 will open/close to direct hydraulic fluid flow to extend the first actuator 68 and retract the second actuator 69. When the main controller 70 is pushed to the right, valves on the valve box 74 will open/close to direct hydraulic fluid flow to extend the second actuator 69 and retract the first actuator 68. Extension and retraction of the actuators 68, 69 will control the pivoting or articulating motion of the front frame 31 with respect to the rear frame 40.

The second pump 65 may comprise various types of pumps, but will preferably comprise a gear pump. Although not shown, the second pump 65 may also utilize a filter 63 or may share a filter 63 with the first pump 62. A plurality of actuator conduits 66 extend from the second pump 65 (or its associated filter 63) to feed the actuators 68, 69 connected between the front frame 31 and rear frame 40 of the articulating frame 30.

The second pump 65 will also provide hydraulic flow to the hydraulic ports 80, 82 for the bed 90. Moving the bed controller 57 forward will open/close valves on the valve box 74 to direct hydraulic flow through the hydraulic ports 80, 82 to activate the bed motor 96 in a first direction, which will move the floor surface 94 of the bed 90 forward. Moving the bed controller 57 backwards will open/close valves on the valve box 74 to direct hydraulic flow through the hydraulic ports 80, 82 to activate the bed motor 96 in a second direction, which will move the floor surface 94 of the bed 90 in reverse.

As shown in FIG. 9, a hydraulic reservoir 67 provides the hydraulic fluids for the first and second pumps 62, 65. The hydraulic reservoir 67 may be positioned at various locations, but will preferably be positioned near the rear end 42 of the rear frame 40 as shown in the figures. The hydraulic reservoir 67 is fluidly connected to the first pump 62, the second pump 65, and the hydraulic ports 80, 82 of the present invention so that it supplies hydraulic fluids for powering the wheels 46, the actuators 68, 69 and the bed 90.

As best shown in FIGS. 7 and 8, one or more actuators 68, 69 are operable to pivot or articulate the front frame 31 and platform 20 with respect to the rear frame 40. The numbering, positioning, and orientation of the actuators 68, 69 may vary in different embodiments.

In a preferred embodiment as shown in FIG. 7, a first actuator 68 and a second actuator 69 each extend between the rear frame 40 and the front frame 31 in opposing diagonal orientations. The proximate ends of each actuator 68, 69 is preferably connected to the rear frame 40, with the distal ends of each actuator 68, 69 being connected to the mounts 35, 37 on the front frame 31. Extension of the first actuator 68 and retraction of the second actuator 69 articulates the front frame 31 and platform 20 in a first direction while extension of the second actuator 69 and retraction of the first actuator 68 articulates the front frame 31 and platform 20 in a second direction.

F. Main Controller

As shown in FIGS. 1-6, the present invention preferably utilizes a single main controller 70 which controls operation of both the actuators 68, 69 to provide articulating movement of the front frame 31 and platform 20, and the wheels 46 for providing forward and reverse movement of the present invention as a whole. It should be appreciated that, in some embodiments, multiple controllers 70 may be utilized to perform these functions.

Preferably, the main controller 70 comprises a joystick which an operator 12 may easily manipulate to control movement of the present invention. The main controller 70 may be positioned at various locations on the present invention, but will preferably be positioned on the platform 20 for ease-of-access. In the figures, a controller mount 72 extends upwardly from the platform 20, with the main controller 70 being connected to an upper end of the controller mount 72. As shown in the figures, the controller mount 72 may comprise an elongated pole or the like which extends upwardly from a central location on the front end 32 of the front frame 31. This positioning allows for easy access to the main controller 70 by an operator 12 standing on the platform 20. Preferably, the main controller 70 will be elevated to approximately waist-level for the operator 12 so that it can be easily access whether standing upright or leaning against the storage container 28.

G. Bed

The present invention is adapted for use with a wide range of attachments. Thus, the scope of the present invention should not be construed as limited by the exemplary description and figures, which describe and show a bed 90 attachment. As should be appreciated by one of skill in the art, the present invention may be utilized in conjunction with a variety of attachments or accessories. These attachments or accessories may be hydraulically-connected to the present invention as described herein.

Figure 10:
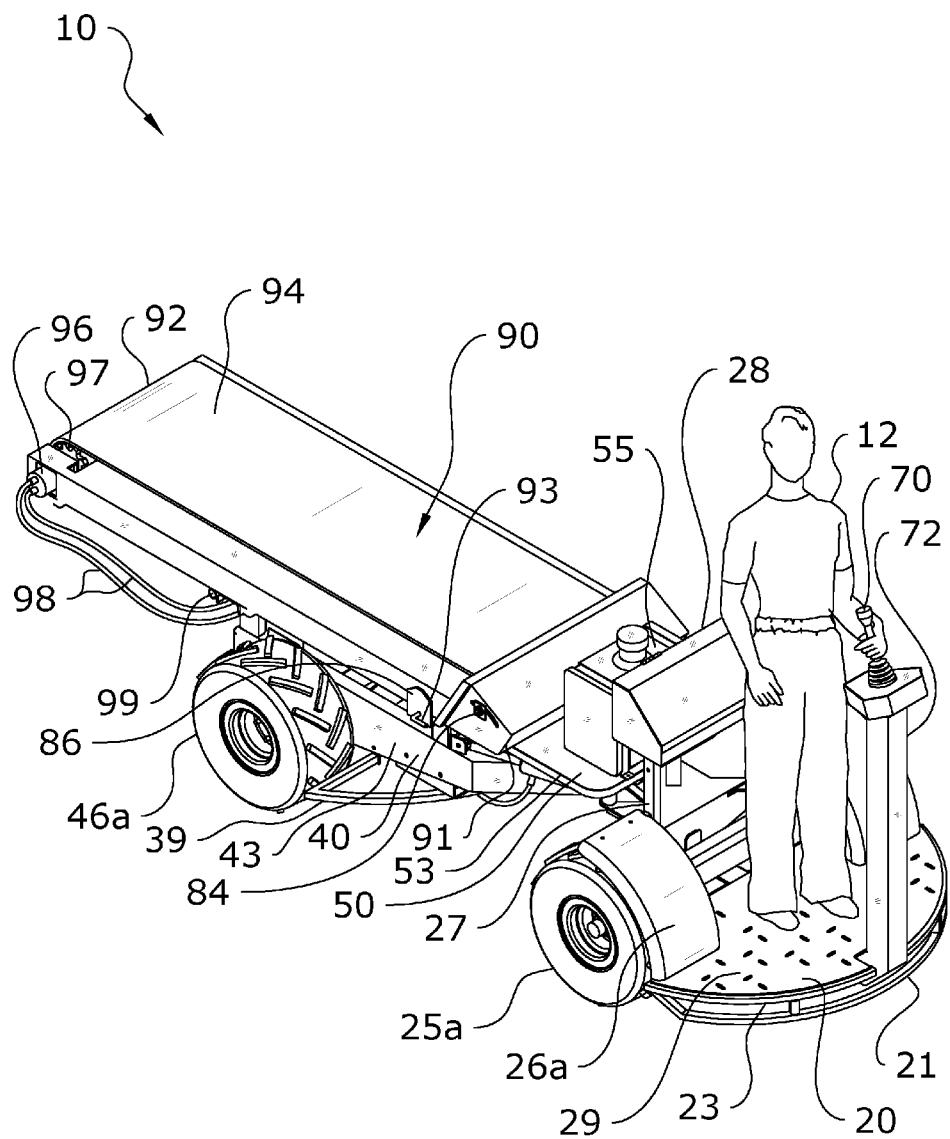
FIG. 10 is an upper perspective view of the present invention utilizing a bed without walls.

As shown in FIGS. 1, 2, 5, 6, 8, and 10, the present invention may include a bed 90 which is secured to the rear frame 40, such as via the bed supports 48. The bed 90 may be utilized for receiving and transporting a load of objects 13. Any number of types of beds 90 may be utilized, such as a cargo bay or flat-bed or powered beds 90 such as a conveyer, various implements, or the like. By using the hydraulic ports 80, 82 and the bed controller 57, these beds may be operated from the platform 20 of the present invention. The bed 90 may include a plurality of rails or walls 95 along its outer perimeter to maintain objects 13 within the bed 90, such as when the bed 90 is in motion. As shown in the figures, the walls 95 may be positioned at various locations along the outer perimeter of the bed 90, such as at the front end 91 and both sides. FIG. 10 shows an embodiment in which no walls 95 are utilized.

The bed 90 will generally be at a higher elevation than the platform 20 as shown in FIG. 5. For example, the floor surface 94 of the bed 90 may be positioned at a distance b above the ground surface 14, wherein the distance a of the platform 20 is less than the distance b of the bed 90. In a preferred embodiment, distance b is between 24 and 48 inches above the ground surface 14.

One or more guards 39 may be provided which provide protection to the wheels. The guards 39 generally extend across the wheels as shown in the figures to keep animals from going under the wheels. In some embodiments, the guards 39 may provide the additional functionality of providing a step on which an operator 12 may stand to gain access to the bed 90. These guards 39 may be attached at various locations along the articulating frame 30, but will preferably extend from the respective sides 43, 44 of the rear frame 40 as shown in the figures.

In the embodiment shown in FIG. 8, an exemplary bed 90 comprised of a conveyer is shown. In such an embodiment, the floor surface 94 of the bed 90 may be movable in a forward or reverse direction in response to inputs from the bed controller 57. To effectuate such movement, the bed 90 may include a bed motor 96 which moves gears 97 that translate power from the bed motor 90 into movement of the floor surface 94. In embodiments in which the bed motor 96 comprises a hydraulic motor, bed conduits 98 may be provided which are connected between the bed motor 96 and the hydraulic ports 80, 82 of the articulating frame 30. A tensioner or adjuster 84 may be provided which allows adjustment of the tension of the bed 90 cable, such as shown in FIG. 2. Various types of adjusters 84 may be utilized, including pillow boxes and the like.

As shown in FIG. 10 the bed 90 may comprise a front end 91 and a rear end 92. The bed 90 may be tiltable in some configurations, such as by including a hinge 99 at the front end 91 or the rear end 92 of the bed 90 where it connects to the articulating frame 30 as shown in FIG. 6. The bed 90 is preferably tiltable to allow easy access to the underlying components of the present invention, such as the hydraulics and motor 60, for servicing or replacement.

While the figures illustrate that the bed 90 is hingedly connected at its rear end 92 to the articulating frame 30, a reverse configuration may be utilized wherein the bed 90 is instead hingedly connected to the articulating frame 30 at its front end 91. In either case, one or more locking pins 93 may be provided to removably engage or disengage the bed 90 with the articulating frame 30. In the exemplary figures, a pair of locking pins 93 are utilized, with a first locking pin 93 connecting the front end 91 of the bed 90 with a first side of the articulating frame 30 via a first bracket 86 and a second locking pin 93 connecting the front end 91 of the bed 90 with a second side of the articulating frame 30 via a second bracket 86 as shown in FIGS. 1 and 2.

H. Operation of Preferred Embodiment

In use, an operator 12 will first step up onto the platform 20 at any position along the first or second radial halves 23, 24 of the front end 21 of the platform 20. Due to the low elevation of the platform 20 as shown in FIG. 5, an operator 12 need only step up onto the platform 20 without having to use separate steps, a stool, a ladder, or the like. Due to the unobstructed nature of the platform 20, it is easy to mount or dismount the platform 20 without stepping over any obstructions or moving an obstruction, such as a gate or door.

Once standing on the platform 20 as shown in FIG. 1, the operator 12 may begin use of the present invention. Pushing the main controller 70 forward will direct the motor 60 and first pump 62 to power the wheels 25 and move the present invention in a forward direction. Pulling the main controller 70 backwards will direct the motor 60 and first pump 62 to power the wheels 25 in an opposite direction and thus move the present invention in a reverse direction.

Movement of the main controller 70 to either side will articulate the platform 20 and front frame 31 with respect to the rear frame 40. If the main controller 70 is moved to the right, the second pump 65 will be directed to articulate the front frame 31 to the right as shown in FIG. 8b. If the main controller 70 is moved to the left, the second pump 65 will be directed to articulate the front frame 31 to the left as shown in FIG. 8c.

If the main controller 70 is moved up and to the left, the present invention will be driven forward while the front frame 31 is articulated to the left. If the main controller 70 is moved up and to the right, the present invention will be driven forward while the front frame 31 is articulated to the right. If the main controller 70 is moved down and to the right, the present invention will be driven in reverse while the front frame 31 is articulated to the right. If the main controller 70 is moved down and to the left, the present invention will be driven in reverse while the front frame 31 is articulated to the left. This type of configuration allows the present invention to easily traverse tight spaces and make tight turns or U-turns.

As the present invention is in use, various objects 13 may be placed within the bed 90 to be received or transported such as shown in FIG. 2. Various types of objects 13 may be transported within the bed 90 of the present invention. Although the figures illustrate the objects 13 as comprising livestock, the present invention should not be construed as being so limited. For example, gravel, dirt, hay, rocks, lumber, or any other objects 13 which need to be stored or transported may be loaded into the bed 90 of the present invention.

In embodiments in which the bed 90 comprises a moving floor surface 94 (such as a conveyer configuration as shown in FIG. 8a); the bed 90 will need to be interconnected with the hydraulic system of the present invention. Bed conduits 98 comprising hydraulic lines will be connected between the bed motor 96 and the hydraulic ports 80, 82 extending from the articulating frame 20 as shown in FIG. 10. Thus, the bed motor 96 will not necessitate its own hydraulic supply.

With the bed 90 properly hooked up hydraulically, the floor surface 94 of the bed 90 may be conveyed forward or reverse by use of the bed controller 57 which is preferably positioned within easy access of the operator 12 on the platform 20. If the bed controller 57 is pushed forward, the floor surface 94 of the bed 90 will advance in a forward direction. If the bed controller 57 is pulled backwards, the floor surface 94 of the bed 90 will move in a reverse direction. If the bed controller 57 is retained in a central (neutral) position, the floor surface 94 of the bed 90 will remain stationary. Thus, the conveying floor surface 94 of the bed 90 may be utilized to aid in loading, stacking, or unloading objects 13 to/from the present invention.

In some situations, it may be preferable to tilt the bed 90 upwardly as shown in FIG. 6 to aid in unloading objects 13 or to provide access to the underlying structures (such as hydraulics) for servicing or replacement. To do so, the locking pins 93 are disengaged to allow the bed 90 to be manually tilted upwardly about the hinge 99. When completed with unloading, the bed 90 may be tilted downwardly to a straight orientation. The locking pins 93 may then be engaged to lock the bed 90 in such a configuration against the articulating frame 30.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An articulating cart system, comprising:
   an articulating frame including a front frame and a rear frame pivotally connected to the front frame;
   a platform connected to the front frame, wherein the platform extends forwardly from the front frame;
   a first actuator connected between the rear frame and the front frame for pivoting the front frame with respect to the rear frame;
   a plurality of wheels including a first wheel connected to the platform and a second wheel connected to the articulating frame; and
   a motor connected to the articulated frame for powering the wheels and the first actuator, wherein a rear end of the platform includes a storage container on which an operator may lean or sit.

2. The articulating cart system of claim 1, wherein the platform is closer to a ground surface than the articulating frame.

3. The articulating cart system of claim 1, wherein an upper surface of the platform is between 3 and 9 inches above a ground surface.

4. The articulating cart system of claim 1, wherein the motor is mounted behind the platform.

5. The articulating cart system of claim 4, wherein the motor is centrally located on the articulating frame.

6. The articulating cart system of claim 1, wherein the platform comprises a flat planar structure.

7. The articulating cart system of claim 6, wherein the platform includes a rounded front end.

8. The articulating cart system of claim 7, wherein the platform includes a first radial half and a second radial half, wherein the first radial half and the second radial half of the platform are unobstructed.

9. The articulating cart system of claim 1, wherein the platform includes a telescopic container pole, wherein the storage container is connected to an upper end of the telescopic container pole.

10. The articulating cart system of claim 1, including a second actuator connected between the rear frame and the front frame.

11. The articulating cart system of claim 10, wherein extending the first actuator and retracting the second actuator articulates the platform in a first direction with respect to the rear frame and wherein extending the second actuator and retracting the first actuator articulates the platform in a second direction with respect to the rear frame.

12. The articulating cart system of claim 1, including a controller for operating the motor and the first actuator.

13. The articulating cart system of claim 12, wherein the controller comprises a joystick.

14. The articulating cart system of claim 13, including a controller mount extending upwardly from the platform, wherein the controller is connected to an upper end of the controller mount.

15. An articulating cart system, comprising:
an articulating frame including a front frame and a rear frame pivotally connected to the front frame;
a platform connected to the front frame, wherein an upper surface of the platform is positioned between 3 and 9 inches above a ground surface;
a first actuator connected between the rear frame and the front frame for pivoting the front frame with respect to the rear frame;
a plurality of wheels including a first wheel connected to the platform and a second wheel connected to the articulating frame;
a motor connected to the articulated frame for powering the wheels and the first actuator; and
a bed connected to the rear frame for receiving and transporting a load of objects, wherein a floor surface of the bed is at least 24 inches above the ground surface.

16. The articulating cart system of claim 15, wherein the platform is in front of the bed, wherein a floor surface of the bed is between 24 and 48 inches above the ground surface.

17. The articulating cart system of claim 15, wherein the bed includes a conveyer comprising a movable floor surface, a conveyer motor for powering the conveyer, and a lever for controlling the conveyer motor.

18. An articulating cart system, comprising:
an articulating frame including a front frame and a rear frame pivotally connected to the front frame;
a platform connected to the front frame, wherein the platform extends forwardly from the front frame;
a first actuator connected between the rear frame and the front frame for pivoting the front frame with respect to the rear frame;
a plurality of wheels including a first wheel connected to the platform and a second wheel connected to the articulating frame; and
a motor connected to the articulated frame for powering the wheels and the first actuator, wherein a mid-point of the first wheel at least partially extends above an upper surface of the platform.

19. The articulating cart system of claim 18, including a wheel guard extending upwardly from the platform to partially cover the first wheel.

\* \* \* \* \*